(12) United States Patent
Klein et al.

(10) Patent No.: US 8,725,636 B1
(45) Date of Patent: May 13, 2014

(54) METHOD FOR DETECTING FRAUDULENT MONEY TRANSFER

(71) Applicant: Trusteer Ltd., Tel Aviv (IL)

(72) Inventors: Amit Klein, Herzliya (IL); Michael Boodaei, Givatayim (IL)

(73) Assignee: Trusteer Ltd., Tel Aviv (IL)

( * ) Notice: Subject to any disclaimer, the term of this patent is extended or adjusted under 35 U.S.C. 154(b) by 0 days.

(21) Appl. No.: 13/657,352

(22) Filed: Oct. 22, 2012

(51) Int. Cl.
*G06Q 10/00* (2012.01)
(52) U.S. Cl.
USPC ............................................. 705/39; 705/1.1
(58) Field of Classification Search
USPC ........................................................ 705/1.1
See application file for complete search history.

(56) References Cited

U.S. PATENT DOCUMENTS

| 2002/0133721 | A1* | 9/2002 | Adjaoute | 713/201 |
| 2008/0191007 | A1* | 8/2008 | Keay | 235/379 |
| 2008/0301051 | A1* | 12/2008 | Stahlberg | 705/44 |
| 2011/0055078 | A1* | 3/2011 | Nandy | 705/39 |
| 2012/0041841 | A1* | 2/2012 | Hu et al. | 705/26.35 |
| 2012/0239557 | A1* | 9/2012 | Weinflash et al. | 705/39 |
| 2012/0259753 | A1* | 10/2012 | Orad et al. | 705/35 |
| 2013/0144784 | A1* | 6/2013 | Yang et al. | 705/44 |

OTHER PUBLICATIONS

TrustDefender Develops Security and Fraud Risk Management Solutions to Identify and Stop Fraudulent Activity Anonymous. Wireless News (Apr. 11, 2011).*
The banking malware scourge—Savage—Apr. 2010.*
The case of the fake money-mules: Inside the URLZone Trojan network by Ryan Naraine for Zero Day | Oct. 5, 2009.*

* cited by examiner

*Primary Examiner* — William Rankins
(74) *Attorney, Agent, or Firm* — Merchant & Gould P.C.

(57) ABSTRACT

A method detects fraudulent transaction of money transfer to a mule account, according to which a detection software module is injected into a browser or a website to be protected. The detection module traces the content and the activities performed on a webpage of the website and detects any exceptional activity/condition which may be fraudulent online activity performed by malware and waits until all sensitive data to perform a fraud transaction is entered. Then the detection module stores and/or forwards the details of the mule account that has been used for the fraudulent transaction.

12 Claims, 1 Drawing Sheet

US 8,725,636 B1

METHOD FOR DETECTING FRAUDULENT MONEY TRANSFER

FIELD OF THE INVENTION

The present invention relates to the field of malware detection and prevention. More particularly, the invention relates to a method for detecting, and preventing, fraudulent transaction of money transfer from a victim's computer infected by malware, to a fraudster by using a mule account.

BACKGROUND OF THE INVENTION

A growing concern of online users is the possibility of interception or exploitation of their personal information by fraudsters. For example, a user is liable to be tricked into providing personal information to a fraudster or to a bogus website, allowing the fraudster to perform online transactions.

Another type of fraudulent activity perpetrated online is the transfer of money obtained as a result of a scam. Fraudsters recruit people that have legitimate bank accounts (often called "mules") to provide their account details for the purpose of carrying out a fraudulent transaction, during which money is transferred from the account of the victim (the person from the account of whom money is stolen) to this recruited legitimate bank account (often called a "mule account", which receives fraudulent transfers of money).

Potential mules are recruited by various techniques such as by sending e-mails, via job search websites, and through Internet blogs. The potential mule is lured to provide his legitimate bank account details by a convincing fictitious story, whereby a sum of money is then received in the mule's bank account while the mule is offered a portion of the received money as commission. The mule is instructed to transfer the balance to another party, often resulting in a chain of fraudulent activity. For example, the mule knowingly or unknowingly acts as a channel (middleman) to perform fraudulent transfer of money and finally, the mule drafts the transferred amount (that actually was stolen from the victim) and delivers it to the fraudsters (e.g., by depositing it through remote clearance or cash delivery systems like Western Union). This way, it is harder to track fraudsters and incriminate them. This way, fraudsters can collect a plurality of legitimate accounts, which will be stored and then used as mule accounts for fraudulent activity, even though in most cases, if the fraudulent activity will be identified, the mule will be targeted by law enforcement authorities. However, it is hard to incriminate the mule that often claims that he was not aware of the fact that he has been used as a middleman for carrying out a fraudulent transaction.

When the victim's browser is infected with malware, the malware waits for the victim to log-in into his bank account and as soon as the victim completes the identification process and gets in, the malware can start acting within the relevant web-pages in the website of the bank.

Since the malware operations are invisible, as soon as the victim logs-in and is inside a legitimate web-page of the bank, the malware secretly opens an invisible IFrame (an element of a predetermined size and location on a web page that opens a transaction page on the bank's domain) in the current page, through which the malware forces the victim's browser to navigate to a new transaction page in the same website. The whole process is performed within this IFrame, which is invisible to the victim but is accessible to, and controlled by the malware.

It is therefore an object of the present invention to provide a method for detecting the fraudulent transfer of money from a victim's legitimate account to a mule account.

It is an additional object of the present invention to provide a method for identifying the beneficiary of the fraudulent transfer and to prevent additional fraudulent activities.

Other objects and advantages of the invention will become apparent as the description proceeds.

SUMMARY OF THE INVENTION

The present invention is directed to a method for detecting fraudulent transaction of money transfer to a mule account, according to which a detection software module is injected into a browser or a website to be protected. The detection module traces the content and the activities performed on a webpage of the website and detects any exceptional activity/condition which may be fraudulent online activity performed by malware and waits until all sensitive data to perform a fraud transaction is entered. Then the detection module stores and/or forwards the details of the mule account that has been used for the fraudulent transaction.

The detection module may be configured to mark a current transaction as fraudulent, if an exceptional activity/condition is detected.

The detection module may also be configured to perform a preventive action such as blocking the transaction, or to report about the fraudulent transaction and to aggregate and store, a plurality of mule accounts to be blocked.

The fraudulent transaction may be generated by malware using Ajax.

Whenever the malware retrieves a mule account in real-time for each transaction from a remote server, the detection module may be configured to detect the retrieval and marks the current transaction as fraudulent.

Whenever the malware automatically fills in the fields in the fraudulent transaction form, the detection module may be configured to detect the automatically filling and marks the current transaction as fraudulent.

The detection module may be configured to seek invisible IFrames in a legitimate web page and may be a JavaScript code snippet that is integrated into a legitimate transaction web page.

DETAILED DESCRIPTION OF PREFERRED EMBODIMENTS

Figure 1:
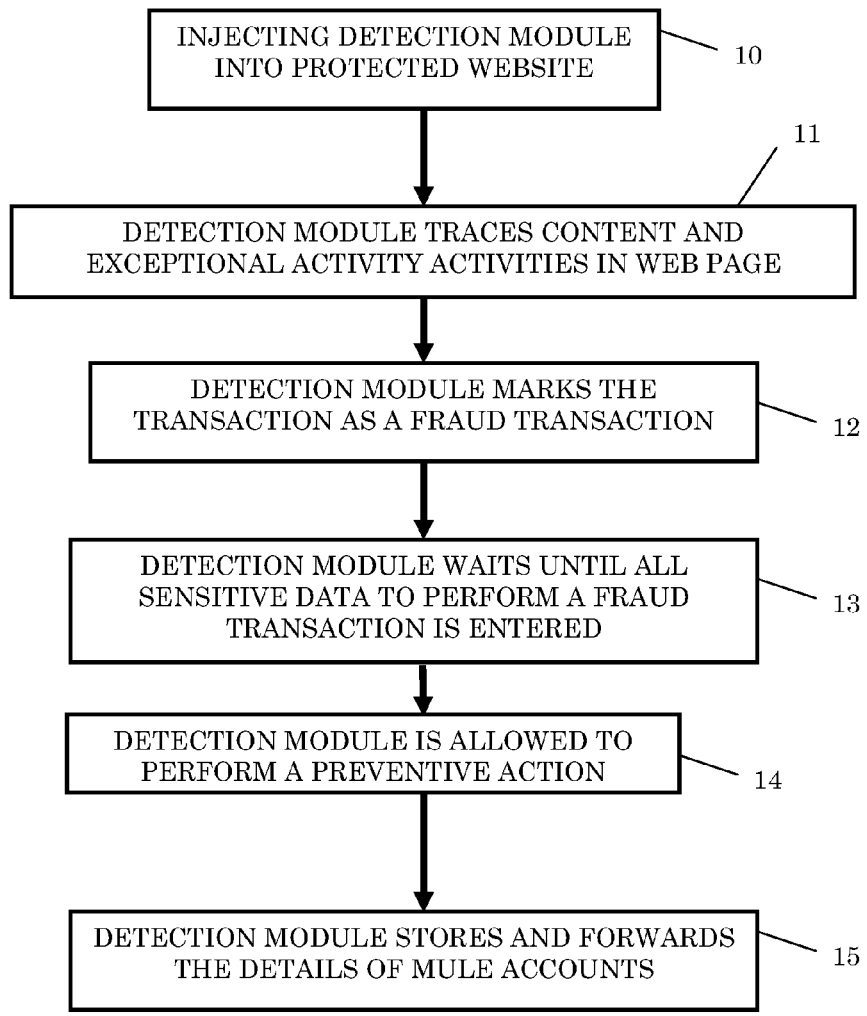
FIG. 1 is a method for detecting and preventing fraudulent money transfer, according to one embodiment of the present invention.

The present invention is a method for detecting fraudulent money transfers that are transferred to a mule account.

In order to complete the new fraudulent transaction, the malware needs to fill the transaction form. The malware can submit the form using Ajax (Asynchronous JavaScript and XML—is a method of building interactive applications for the Web that process user requests immediately. Instead of loading a traditional Web page, the user's browser loads the Ajax engine, which displays the page the user sees. The engine continues to run in the background, using JavaScript to communicate with the browser), which does not require loading the page of the new fraudulent transaction from an external source. Alternatively, it can use regular form submission in a hidden frame.

The malware further needs a mule account, to which the money will be transferred from the victim's account. Generally, the mule account is excluded from the malware configuration, since after a fraudulent transaction is made, the victim will discover the fraud and will report to the bank, in order to get his money back. As a result, the mule account will enter a "black list" of the bank and will be blocked for future transactions. Therefore, it is unwise to "hardwire" the mule account into the malware configuration, as it can only be used once (or very few times).

In order to eliminate such blocking, the mule account is retrieved by the malware in real-time for each session (transaction) from a remote server, which stores many mule accounts. This way, it will be harder for the bank to detect the fraud, since each time the malware uses a different mule account.

The malware is configured to automatically fill in the fields in the fraudulent transaction's form, including the mule account for the current session and after that to automatically activate the "submit" button that uploads the transaction details.

The present invention proposes a method and software for detecting attempts to perform fraudulent money transfers that are transferred from the victim's account to a mule account by injecting a detection software module into the victim's browser or into the website of the bank. The detection software module is adapted to detect whether the source code associated with an online banking form has been modified, thereby indicating the presence of malware that has been injected into the victim's browser. Even though a downloadable banking form appears no different to the victim after its source code has been fraudulently modified than an original form associated with unmodified source code, the modification to the source code allows the fraudster to transfer funds to the mule account without knowledge of the victim, since all the actions are made within an invisible IFrame that is opened in the legitimate web page of the bank.

This detection software module may be a snippet of code (e.g., a JavaScript) that is integrated into the legitimate transaction page of the bank. This code is adapted to detect any exceptional activity/condition with the web page during a session, such as automatic filling of the required fields in a transaction form, browsing to another remote location during a session in order to retrieve details of a mule account, the fact that a transaction form is being within an IFrame. Other parameters can also be used by the detection module, in order to determine whether or not an IFrame is a part of the original web-page of the bank, or this IFrame has been created by the malware.

Once such an exceptional activity/condition is detected, the detection module can mark the transaction as a fraud transaction, block the transaction, report to the bank and/or to other authorities or extract the details of the mule account from the transaction form before the "submit" button is activated.

FIG. 1 illustrates a flow chart of method for detecting and preventing fraudulent money transfer, according to one embodiment of the present invention. In the first step 10, the detection module is been injected into the victim's browser and/or into the webpage of the bank. At the next step 11, the detection module traces the content and the activities performed on the webpage of the bank, in order to determine whether the victim's account is subject to any exceptional activity/condition, which may be fraudulent online activity. If any exceptional activity/condition is detected, at the next step 12, the detection module marks the transaction as a fraud transaction. At the next step 13, the detection module waits until all sensitive data to perform a fraud transaction is entered. At the next step 14, the detection module is allowed to perform a preventive action or is configured just to report to the bank and/or to other authorities. At the next step 15, the detection module stores and/or forwards the details of the mule account that has been used for this fraud transaction. This way, the detection module is able to aggregate a plurality of mule accounts and report.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A computer implemented method for detecting fraudulent transaction of money transfer to a mule account, comprising:
   injecting a detection software module into a browser or a website to be protected, said browser or website running on a computerized device in data communication with a data network;
   the detection module performing the following operations:
   tracing content and activities performed on a webpage of said website;
   detecting an activity or condition that is indicative of fraudulent online activity performed by malware;
   waiting until all sensitive data to perform a fraudulent transaction is entered; and
   storing or forwarding details of the mule account used for said fraudulent transaction.

2. The method according to claim 1, further comprising configuring the detection module to mark a current transaction fraudulent that has activity or a condition indicative of fraudulent online activity performed by malware.

3. The method according to claim 2, further comprising configuring the detection module to perform a preventive action or to report about the fraudulent transaction.

4. The method according to claim 1, further comprising the detection module aggregating and storing a plurality of mule accounts to be blocked.

5. The method according to claim 1, wherein a fraudulent transaction is generated by malware using Ajax.

6. The method according to claim 1, wherein whenever the malware retrieves a mule account in real-time for each transaction from a remote server, the detection module detects the retrieval and marks a current transaction as fraudulent.

7. The method according to claim 1, wherein whenever the malware automatically fills in fields in a fraudulent transaction form, the detection module detects the automatic filling and marks a current transaction as fraudulent.

8. The method according to claim 1, wherein the detection module seeks invisible IFrames in a legitimate web page.

9. The method according to claim 1, wherein the detection module is a JavaScript code snippet that is integrated into a legitimate transaction web page.

10. The method according to claim 1, wherein the preventive action comprises blocking the transaction.

11. The method according to claim 1, wherein the details of the mule account that has been used for said fraudulent transaction are stored and forwarded.

12. A system for detecting fraudulent transaction of money transfer to a mule account comprising:

a computerized device in data communication with a data network for performing an online transaction; and a server for injecting a detection software module into a browser or a website to be protected, said browser or website running on said computerized device;

said detection software module being operable to perform the following functions:

tracing content and activities performed on a webpage of said website;

detecting an activity or condition which is indicative of fraudulent online activity performed by malware;

waiting until all sensitive data to perform a fraudulent transaction is entered; and storing or forwarding details of the mule account that has been used for said fraudulent transaction.

\* \* \* \* \*